3,253,876
TEXTILE DYEING USING DISAZO DYES

David H. Wilcox, Jr., and William L. Hicks, Kingsport, Tenn., assignors to Eastman Kodak Company, Rochester, N.Y., a corporation of New Jersey
No Drawing. Filed Apr. 12, 1963, Ser. No. 272,547
8 Claims. (Cl. 8—26)

This invention relates to disazo compounds and, more particularly, to mixtures of disazo compounds especially useful for coloring textile materials.

It is known that disazo compounds having the formula (I) 

in which X, Y and Z are benzene radicals, have limited utility for dyeing cellulose ester and synthetic polyamide fibers unless the X, Y or Z benzene radicals are substituted suitably with, for example, methoxy, acylamide or nitro groups.

We have discovered that in the case of disazo dyes having the general formula (II)

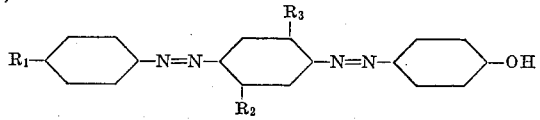

wherein $R_1$, $R_2$ and $R_3$ each represent hydrogen, lower alkyl, lower alkoxy or acylamido groups, a substantial and unexpected synergistic increase in tinctorial strength is obtained if a mixture of two or more of the disazo dyes having this formula is used for dyeing cellulose ester and polyamide textile materials. Thus, dye strengths as high as 200% of the dye strength of the individual dyes is obtained by use of the dye mixtures.

The following disazo dyes having the above general formula are representative of those useful in the disazo dye mixtures of our invention.

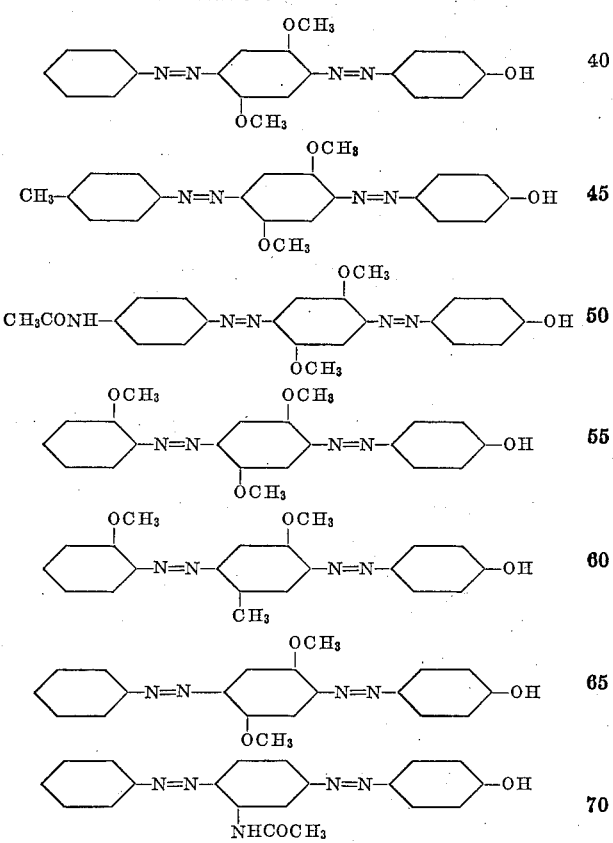

The following examples will serve to illustrate our invention.

*Example 1.*—Preparation of 4[4′-(phenyl- and p-tolylazo-2′,5′-dimethoxyphenylazo)phenol] from the intermediates aniline and p-toluidine To a mixture of 25.9 g. of para-toluidine and 22.5 g. of aniline slurried well in 92.5 ml. of water were added 70 g. of 93% sulfuric acid below 40° C., and the mixture cooled to 0 to 5° C. with about 350 g. of ice. Then added a solution of 33.5 g. of sodium nitrite dissolved in 58 ml. of water. The slurry was stirred for 45 minutes to diazotize when sulfamic acid was added to destroy the excess of nitrous acid. The diazo solution was added over about 30 minutes to a slurry prepared as follows: a solution of 67.8 g. of 2,5-dimethoxyaniline in 22 ml. of water, 85.6 g. of acetic acid and 3.3 g. of Igepon T (sodium-N-methyl-oleyl taurate) added to 900 ml. of water containing 78.8 g. of 50% sodium hydroxide and 2.05 g. of Marasperse N. Marasperse N is an aqueous solution of sodium lignin sulfonate. An hour after the diazo addition the slurry of the azo intermediate was neutralized by adding 478 ml. of 10% sodium hydroxide. The azo compound was filtered, washed, and the resultant paste was used as follows:

46 g. of the past was slurried in 110 ml. of water, added 20 g. of acetic acid and 13.3 g. of 93% sulfuric acid, cooled to 5° C., and a solution of 6 g. of sodium nitrite dissolved in 14 ml. of water was added. The diazotization was complete in two hours. The resulting diazo solution was added to a solution of 9.33 g. of phenol in 340 ml. of water, 43 g. of sodium carbonate, and 0.5 g. of Marasperse N. After coupling for 1 hour, the dye was isolated.

The orange dye mixture obtained is a mixture of substantially equal amounts of the two dyes

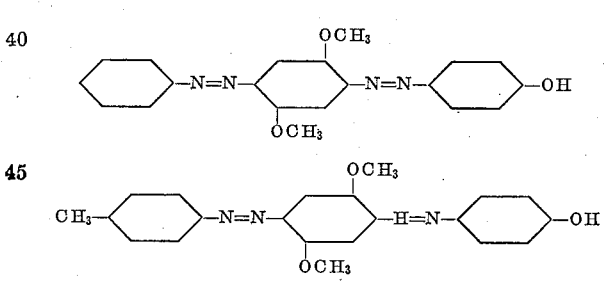

The dye mixture was standardized and used for orange dyeings on cellulose acetate fabric by the following method:

300 mg. of the standardized dye mixture of the two dyes is weighed into a clean dye beaker and pasted thoroughly with 10–20 ml. of water at 140° F., then 15 cc. of a 2% wetting agent solution such as Igepon T or a similar type of wetting agent is added. Water at 120–140° F. is added while stirring constantly until a volume of 300 ml. is obtained. Place 10 grams of acetate tricot jersey fabric in the dyebath, and starting at a temperature of 120–140° F. raise to 180° F. in approximately 20 minutes, with constant stirring or agitation and continue at this temperature for 1 hour. Rinse the dyeings thoroughly in running water and dry in an oven at 180–200° F.

As a result, the mixture of dyes showed approximately 200% dyeing strength on cellulose acetate at 3% level dyeing compared to the dyeing strength of the separate dyes comprising the mixture.

*Example 2.—Preparation of 4-[4'-(phenyl- and p-tolyl-azo-2',5'-dimethoxyphenylazo)phenol] from the intermediates 4 - phenylazo - 2,5 - dimethoxyaniline and 4-(4'-methylphenylazo)-2,5-dimethoxyaniline*

To a mixture of 8.6 g. of 4-phenylazo-2,5-dimethoxyaniline, and 9.0 g. of 4-(p-tolylazo)-2,5-dimethoxyaniline slurried well in 133 ml. of water were added 20 g. of acetic acid. The mixture was stirred for five minutes and then 13.3 g. of 93% sulfuric acid were carefully added. The slurry was cooled to 5–10° C. by the addition of ice, and a solution of 6 g. of sodium nitrite in 14 ml. of water was added. The slurry was stirred for two hours to complete diazotization.

To a solution of 4.7 g. of sodium carbonate and 70 ml. of water were added 9.33 g. of phenol, and this solution was drowned in a solution of 0.5 g. of Marasperse N, and 38 g. of sodium carbonate in 270 ml. of water. The diazo slurry was then added below 20° C. The dye slurry was stirred one hour, and the dye isolated.

The resultant dye mixture containing the same dyes as those of Example 1 was standardized and used for dyeing cellulose acetate and nylon (polyamide) textile materials as described in Example 1. The dye mixture again showed a 200% dye strength at 3% level dyeing compared to the individual dyes.

*Example 3*

To the diazo dye mixture prepared as in Example 2 was added the following blue anthraquinone dye

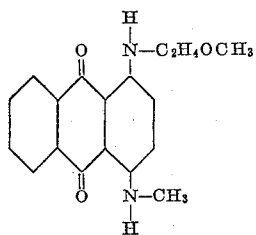

to obtain a rich brown dyeing mixture which was used for dyeing cellulose acetate fabric in the manner described in Example 1. The dye mixture showed 200% dyeing strength at 3% level dyeing compared to 100% and 75% dyeing strengths for the separate disazo dyes. When the same three-component dye mixture was used for dyeing nylon fabric, 210% dyeing strength was obtained compared to 100% dyeing strengths for each of the disazo dyes present in the mixture.

The increased dyeing strength of the dye mixture on the nylon fabric was verified analytically by extraction of the dye with ethylene glycol monomethyl ether and using colorimetric methods for analysis. Thus, in one test, two dye baths were prepared, each containing 0.015 g. of the individual disazo dyes, and a third bath contained 0.015 g. of the mixture of the three dyes of Example 3. Upon extraction of nylon dyeings, 0.0860 g. of the three-component dye mixture was recovered and 0.0692 g. and 0.0640 g. disazo dye, respectively, from the nylon dyeings made with the separate disazo dyes.

Substantially, the same results were obtained when the two disazo dyes of Example 1 were prepared separately and equal parts then mechanically mixed and used for dyeing cellulose acetate. The dyeing had the same shade, luster and 200% tinctorial strength compared to a similar dyeing made with the same amount of one of the disazo dyes 4 - [4' - (phenylazo) - 2',5' - dimethoxyphenylazo]phenol.

A similar result is obtainable when the same disazo dye is mixed with 4-[4'-(p-acetamidophenylazo)-2',5'-dimethoxyphenylazo]phenol and used for dyeing cellulose acetate and nylon. Increased tinctorial power of the order of 180 to 200% may be expected.

The disazo dyes can be used in 50–50 mixtures prepared chemically or mechanically by the methods of Examples 1–3, but proportions of from 75–25 to 25–75 give substantial increases in dye strength.

Cellulose esters which can be dyed with the disazo compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetatebutyrate.

Nylon, in fiber, yarn and fabric form is representative of polyamides which can be dyed with the disazo dye mixtures to obtain increased tinctorial strength.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A composition of matter comprising a mixture of at least two different disazo compounds, each having the general formula

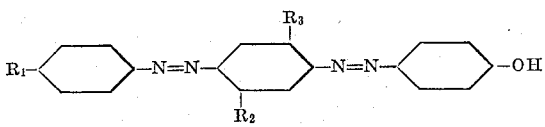

wherein $R_1$, $R_2$ and $R_3$ each represent a member of the class consisting of hydrogen, alkyl, alkoxy and aliphatic acylamido.

2. The composition of claim 1 wherein the mixture of disazo compounds is obtained by diazotization of a mixture of at least two different compounds, each having the general formula

and coupling with a compound having the general formula

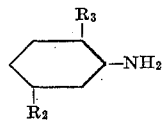

wherein $R_1$, $R_2$ and $R_3$ each represent a member of the class consisting of hydrogen, alkyl, alkoxy and aliphatic acylamido, diazotizing the resultant mixture of monoazo dyes and coupling with phenol.

3. A composition of matter comprising a mixture of disazo compounds having the formulas

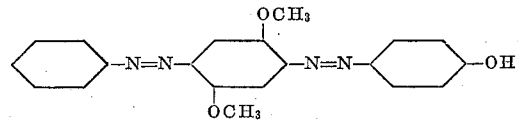

and

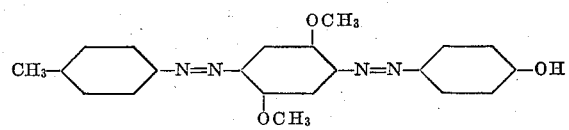

4. A composition of matter comprising a mixture of disazo compounds having the formulas

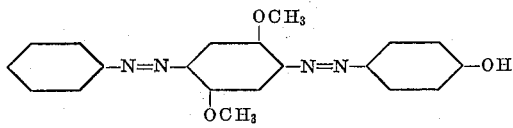

and

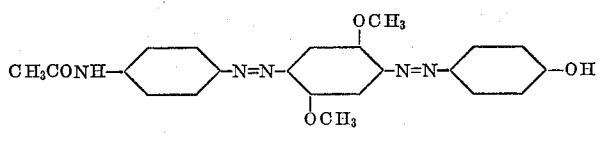

5. The composition of claim 3 further containing the compound

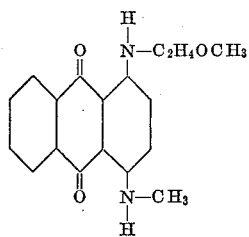

6. A cellulose aliphatic dicarboxylic ester, having 2 to 4 carbon atoms in the acid groups thereof, textile material dyed with the composition of claim 1.

7. A cellulose acetate textile material dyed with the composition of claim 1.

8. A polyamide textile material dyed with the composition of claim 1.

References Cited by the Examiner

UNITED STATES PATENTS

| 2,255,045 | 9/1941 | Dickey | 260—379 |
| 2,782,185 | 2/1957 | Merian | 8—41 |

FOREIGN PATENTS 1,291,988  6/1960  France.

OTHER REFERENCES

Webster's Third New International Dictionary unabridged, Color Chart between pages 448 and 449.

J. TRAVIS BROWN, *Acting Primary Examiner.*

NORMAN G. TORCHIN, ABRAHAM H. WINKELSTEIN, *Examiners.*

D. LEVY, J. HERBERT, *Assistant Examiners.*